Sept. 23, 1924.
P. J. MURRAY ET AL
SHOCK CONTROLLER
Filed May 24, 1923    2 Sheets-Sheet 1
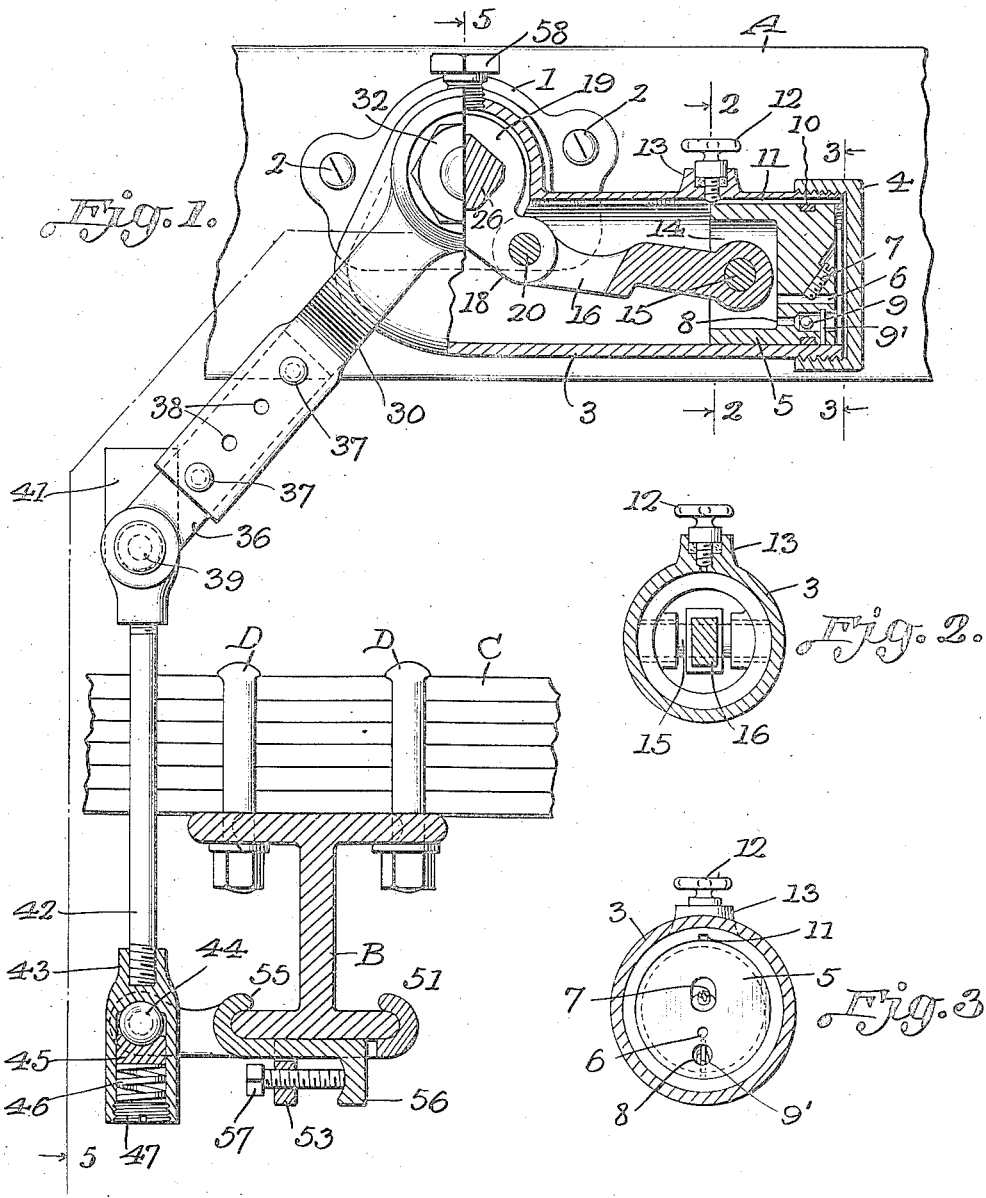
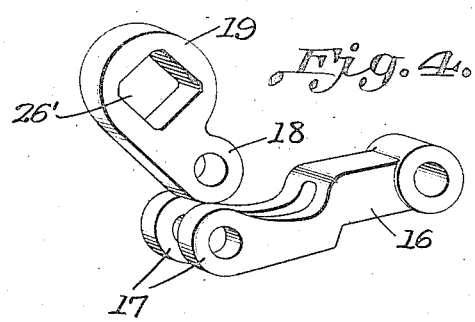
Inventors
Patrick J. Murray
Matthew L. Clark
by their Attorneys

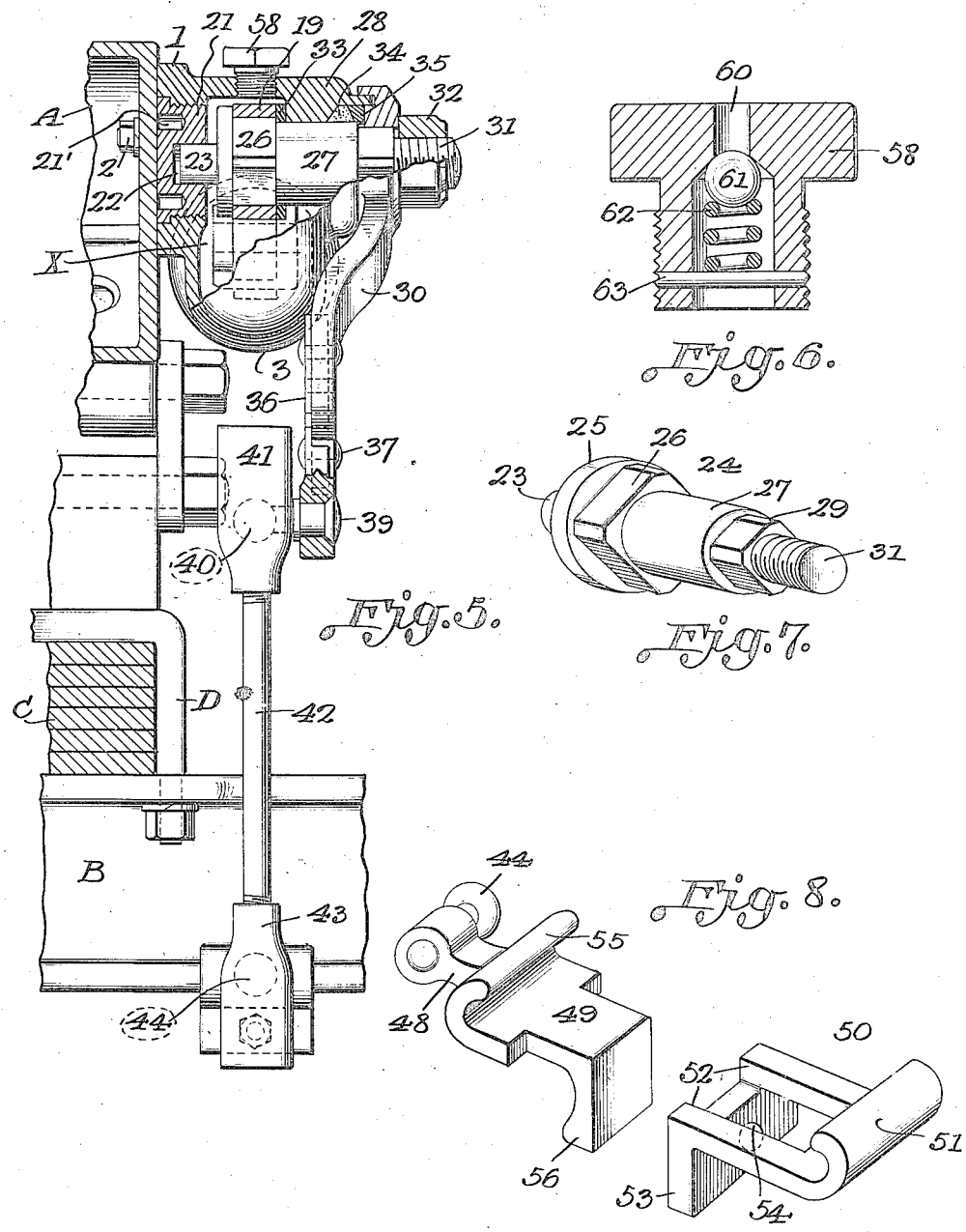

Patented Sept. 23, 1924.

1,509,306

UNITED STATES PATENT OFFICE.

PATRICK J. MURRAY AND MATTHEW L. CLARK, OF CARBONDALE, PENNSYLVANIA, ASSIGNORS TO ADVANCE CAR SPECIALTY MANUFACTURING COMPANY, OF SCRANTON, PENNSYLVANIA.

SHOCK CONTROLLER.

Application filed May 24, 1923. Serial No. 641,211.

*To all whom it may concern:*

Be it known that we, PATRICK J. MURRAY and MATTHEW L. CLARK, both citizens of the United States, and residents of Carbondale, in the county of Lackawanna and State of Pennsylvania, have invented certain new and useful Improvements in Shock Controllers, of which the following is a specification.

Our invention relates to mechanism for controlling the shock usually transmitted to the body of a motor vehicle when passing over irregularities in the roadway, and is designed to prevent or control the resulting sudden movements.

An object of the invention is to provide a device of this character which is simple and efficient and can be applied to the automobile with substantially no change in the machine.

Another object is to provide readily removable means for attaching a portion of the mechanism to the axle or similar part and for transmitting the movements of this part to the controller proper.

Another object is the provision of a dash pot which can be easily adjusted to offer more or less resistance to the movement of the piston, and in which the resistance is greater in one direction than the other.

Another object is the provision of means whereby the friction that tends to impede the turning of the operating arm will vary according to the pressure in the dash pot.

Other objects will be apparent from the following detailed description and the appended claims.

In the drawings:—

Figure 1 is a longitudinal section of the device in position on the car with parts in section to show the attaching means and the interior of the dash pot.

Figure 2 is a section on the line 2—2 of Figure 1.

Figure 3 is a section on the line 3—3 of Figure 1.

Figure 4 is a detail view of members for transmitting movement from the crank arm to the dash pot.

Figure 5 is a section on the line 5—5 of Figure 1.

Figure 6 is a section of the filling valve.

Figure 7 is a detail view of the pin upon which the crank and arm link to the piston are mounted.

Figure 8 is a detached view of the members forming the clamp attached to the axle.

There is illustrated a portion A of the frame or chassis, the axle B, a spring C and bolts D for securing the spring to the axle. These parts may be of any old or usual type, as the invention may be used in connection with any car.

A hollow casing 1 is secured by bolts 2 which pass through ears thereof, to the frame A. This casing has a cylindrical extension 3 closed by a threaded cap 4, in which extension is adapted to reciprocate a piston 5. This piston has an opening 6 therethrough adjustably regulated by a screw 7 which can be adjusted when the cap 4 is removed, and also another opening 8 having therein a ball valve 9 retained in position by a pin 9'. A ring packing 10 is set in a groove encircling the piston 5 and produces tight engagement between the piston and the walls of the casing 3 except for a groove 11 that runs longitudinally of the piston on one side. The size of the groove is varied by a screw 12 threaded into a boss 13 of the casing, the point of which screw is adapted to close the groove 11 to a greater or less degree. If desired the screw may be gradated on its head and an indication placed on the casing so that the degree to which the groove 11 is closed can be determined by an inspection of the relation of the gradations to the indication. This enables the shock controller to be set for different loads from the outside without any difficulty and in a minimum of time.

The inner face of the piston 5 has a depression 14 and a pivot pin 15 is mounted therein. A link 16 is pivoted on said pin and terminates at its other end in ears 17 between which is adapted to fit a single ear 18 on a short crank arm 19. Both the ears 17 and the ear 18 are provided with registering openings through which passes a pivot pin 20.

A member 21 is screw threaded to fit an opening in the side of the casing 1 and is provided with depressions 21' for engagement by a spanner when it is desired to screw this part into place. The member 21 has a bearing opening 22 for the end 23 of a pivot member 24, shown clearly in Figure 7. Next to the end 23 is a cylindrical portion 25 and adjacent thereto a substantially square part 26 over which fits the similarly shaped opening 26' of the crank arm 19. A somewhat extended cylindrical portion 27 has a bearing in the part 28 of the body of the casing 1 and a smaller squared portion 29 is provided for engagement by the end of the crank arm 30. Finally the bolt 24 terminates in a threaded portion 31 upon which screws a nut 32 to hold the arm 30 in position. An elastic packing ring 33 is provided between the crank arm 19 and the portion 28 of the body, and elastic packing 34 and packing ring 35 is provided at one end of the cylindrical portion 27 and adjacent the crank arm 30.

The crank arm 30 has a second member 36 fastened thereto by bolts 37 adapted to pass through holes 38 in both members, thereby permitting the adjustment of the relative length of the crank arm formed by the two parts 30 and 36. Through the lower end of the member 36 passes a bolt or rivet member 39 terminating at its free end in a ball 40 adapted to engage in a socket member 41. Into the socket member 41 is screw threaded a link 42 which at its other end screws into a similar socket member 43 adapted to receive a ball 44 carried by a clamp member. Since the ball and socket connections are both similar only one is illustrated in detail and this is shown in the lower part of Figure 1. It will be seen that a washer 45 rounded at one side to fit the ball 44 is spring-pressed against the same by a spring 46 which is held in place by a screw 47 which engages the outer end of the socket member 43. By adjustment of the screw 47 the amount of friction between the ball and the socket may be varied.

The ball 44 is carried by an ear 48 of a clamp member 49 which cooperates with a clamp member 50 to engage the axle. The clamp member 50 has a curved edge 51 which will fit the edge of the usual axle and extending therefrom spaced arms 52 joined at their outer ends by a downwardly extending plate or ear 53 having a central opening 54 therein which is screw threaded. The clamp member 49 has a curved edge 55 adapted to engage the other side of the axle, and a downwardly extending plate or ear 56 which is adapted to fit between the arms 52. When the two members are thus interlocked, a screw 57 is screwed through the opening 54 and the end bears against the plate 56 as shown in Figure 1. Thereby both members of the clamp may be forced against the axle with equal force by a single screw.

The casing 1 is provided with a filling plug 58 shown in detail in Figure 6. This is provided with a central passageway 60, enlarged on the inside and closed by a ball 61 held in place by a spring 62 which is engaged by a pin 63 which holds it in place. This provides easy means for filling the casing 1 to the desired extent with the fluid employed, without removing the plug 58. If desired, this may be entirely removed without danger of losing the ball.

When the parts are to be assembled, the cap 4 and the member 21 are removed. The piston 5, link 16 and crank arm 19 are assembled outside and passed into the casing through the open end normally closed by the cap 4. The friction washer 33 and pivot member 24 are then passed into position through the opening normally closed by the member 21, the pivot member being passed through the opening 26' of the crank 19 and through the friction washer 33. The member 21 is then screwed into place, the crank arm 30 placed over the squared portion 29 and the nut 32 screwed on. The device can then be attached to the frame of the vehicle by the screws 2. The operation of the clamp members 49 and 50 and their assemblage is obvious. The set screw 7 is adjusted as desired before the cap 4 is screwed on the casing. The regulating screw 12 can be adjusted at any time. The space within the casing 1 is filled to the desired extent through the filling plug 58.

The operation of the device is evident but may be briefly recapitulated. When any shock occurs that tends to cause the axle B and body A to approach each other, the crank arm 30 will be rocked, and this will turn the pivot member 24 thus rocking the crank 19 and through the link 16 moving the piston 5 toward the left in Figure 1. A small amount of the fluid can pass through the passageways 6, 8 and 11 according to the adjustment of the parts, but the sudden movement of the piston 5 will compress the fluid at the left of the piston. This will of course retard the movement of the piston and absorb the shock that would otherwise be transmitted to the body of the vehicle. It is to be noted that when the fluid is compressed in the portion X of the chamber, it will transmit pressure through the cylindrical portion 25 against the crank arm 19 and then against the friction washer 33, thereby increasing the frictional resistance to the turning of this crank arm 19 and further movement of the piston. In this manner the frictional resistance to the movement of the crank arm 19 and consequently the crank arm 30 varies according to the compression of the fluid in the casing 1 due to the previous movement of the parts.

When the return movement takes place, the passage 8 is closed by the ball valve 9 and therefore the liquid cannot escape so rapidly to the other side of the piston. This prevents rebound on the return movement. The liquid employed is preferably oil, and if it becomes dissipated, air will be drawn in automatically through the plug 58 under control of the ball valve 61.

It will be seen that we have provided a shock controller that can be attached to any car without difficulty, the greatest change that would ever be necessary being the provision of holes for the attaching screw bolts 2. The resistance offered thereby can be varied within wide limits and very readily. The resistance depends not only upon the dash pot effect but also upon the increased frictional resistance to the turning of the crank arm. A very efficient form of clamp has been provided which permits quick attachment or detachment. The intermediate connections including the two ball and socket joints permit the device to operate without strain regardless of any side movement of the body to the axle or of other irregular movements.

Obviously details may be varied without departing from the scope of the invention, and it is to be understood that the invention is limited only by the scope of the appended claims.

We claim as our invention:—

1. A shock controller comprising a casing having a cylindrical extension, a piston working in said extension, a plurality of passages through said piston, means for regulating the size of one passage, a ball valve for closing another passageway during movement of the piston in one direction, a longitudinal groove at the periphery of the piston, and means operated from the outside of the casing for regulating the effective size of the groove.

2. A shock controller comprising a casing having a cylindrical extension, a piston working in said extension, a plurality of passages through said piston, a groove in the interior wall of the extension, means for varying the effective size of the groove, and means whereby the resistance to the movement of the piston in one direction is greater than in the other.

3. A shock controller comprising a casing having a cylindrical extension, a piston working in said extension, means for varying the resistance to the movement of the piston, a crank arm connected to the piston, a bearing for said crank arm, and means whereby the frictional resistance to the movement of the crank arm increases with an increase of pressure in the casing.

4. A shock controller comprising a casing having a cylindrical extension, a piston working therein, a crank arm connected to the piston, a bearing for the crank arm, and a friction washer against which the crank arm is forced when the pressure increases, thus increasing the frictional resistance to the movement of the crank arm and piston.

5. A shock controller comprising a casing, a piston working in said casing, means for operating said piston, and means whereby the frictional resistance opposing said operating means is increased as the pressure on one side of the piston increases.

6. A shock controller comprising a casing, a pivot member mounted to turn therein and having one end mounted in a removable plug and a portion of the body mounted in a bearing in the casing, a crank arm non-rotatably mounted on said pivot member within the casing, means for connecting said crank arm to a piston, a second crank arm non-rotatably mounted on said pivot member outside of the casing, and means connecting said crank arm to the axle.

7. A shock controller comprising a casing, a piston therein, operating means therefor, and clamping means for connecting the operating means to the axle which include a two part clamp, each of said parts engaging one side of the axle and having depending ears, and means for separating said ears and thereby forcing the clamp into engagement with the axle.

8. A shock controller comprising a casing, a piston working in said casing, means for operating said piston, means whereby the resistance to the movement of the piston is greater in one direction than the other, and means whereby the frictional resistance opposing said operating means is increased when the piston is moving in the direction in which it meets the lesser resistance.

9. A shock controller comprising a casing adapted to contain a fluid, a piston working in said casing means for operating said piston, means for permitting passage of the fluid from one side of the piston to the other but more rapidly in one direction than in the other, and means whereby the frictional resistance to said operating means is greater during the movement of the piston in one direction than in the other.

10. A shock controller comprising a casing adapted to contain a fluid, an opening therein, a filling plug fitting in said opening and having a passage therethrough, a spring pressed ball normally closing said passage, and means for retaining said spring pressed ball within said plug.

In testimony whereof, we have hereunto subscribed our names.

MATTHEW L. CLARK.
P. J. MURRAY.